May 12, 1959

S. A. GRAY ET AL 2,885,787

APPARATUS FOR INDICATING AND RECORDING THE DIMENSIONS OF LUMBER

Filed April 25, 1955

INVENTORS
SAMUEL A. GRAY
HUGH P. CARTER
BY

Jennings & Carter

ATTORNEYS

May 12, 1959  S. A. GRAY ET AL  2,885,787
APPARATUS FOR INDICATING AND RECORDING THE DIMENSIONS OF LUMBER
Filed April 25, 1955  5 Sheets-Sheet 3

INVENTOR.
SAMUEL A. GRAY
HUGH P. CARTER
BY Jennings & Carter
ATTORNEYS

May 12, 1959 S. A. GRAY ET AL 2,885,787
APPARATUS FOR INDICATING AND RECORDING THE DIMENSIONS OF LUMBER
Filed April 25, 1955 5 Sheets-Sheet 4

INVENTOR.
SAMUEL A. GRAY
HUGH P. CARTER
BY Jennings & Carter
ATTORNEYS

May 12, 1959     S. A. GRAY ET AL     2,885,787
APPARATUS FOR INDICATING AND RECORDING THE DIMENSIONS OF LUMBER
Filed April 25, 1955     5 Sheets-Sheet 5

INVENTORS
SAMUEL A. GRAY
HUGH P. CARTER
BY
ATTORNEYS

United States Patent Office 2,885,787
Patented May 12, 1959

2,885,787

APPARATUS FOR INDICATING AND RECORDING THE DIMENSIONS OF LUMBER

Samuel A. Gray and Hugh P. Carter, Birmingham, Ala.

Application April 25, 1955, Serial No. 503,626

8 Claims. (Cl. 33—174)

Our invention relates to apparatus for making a printed record of the thickness, width and length of each piece of lumber or similar material as it is delivered from a manufacturing process or the like, such for instance as from a planer.

Heretofore in the art to which this invention relates lumber coming from a planer in a planing mill has been checked manually, a record of each piece being made by marking upon a tabulation sheet prepared for that purpose. This operation requires considerable skill on the part of the checker inasmuch as he must visually determine the thickness, width and length of each board while it is in motion, that is while it is moving longitudinally on the delivery rollers leading from the planer, on the way, ordinarily, to be loaded into a railway car or the like. Further, even with correct judgment of the three dimensions of each piece errors are made in entering the correct information on the sheet. In the past disputes as to the actual contents of carloads of lumber compared to the invoiced or billed contents thereof quite frequently have arisen, and the only check on the exact amount in the car is to count the lumber, piece by piece. Since the car is then at its destination the contents ordinarily cannot be checked by the shipper. Suffice it to say that the manual checking of lumber leaves much to be desired both from the standpoint of accuracy and from the standpoint of sound checking practices.

In view of the foregoing the prime object of our invention is to provide apparatus which automatically makes a printed record, in a plurality of copies if desired, of the lumber delivered from the planer and hence, ordinarily, into the railway car in which it is shipped.

Another object is to provide a counter for lumber in which the thickness, width and length of each individual piece is measured while the board is traveling lengthwise, as for instance just after it has left the planer, the measurements being recorded by indexible printing mechanism, thus to make a permanent, running record of the production of the planer and the amount loaded into the car or into the storage bins.

Another object is to provide apparatus of the character designated in which the indication of the thickness, width and length of each board is electrically transmitted to the printing mechanism, and in which the printing mechanism is electrically indexed in accordance with the signals received from the indicating mechanism, providing apparatus which is simple of construction and positive in operation.

A more specific object of our invention is to provide apparatus for automatically printing the thickness, width and length of boards as they are delivered from a planer and the like in which each of the three dimensions is "sensed" by a Selsyn motor, or similar telemetering devices, there being corresponding Selsyn motors in circuit with the above mentioned three thereof, the latter three motors being operatively connected to index the printing mechanism, whereby the printing mechanism is set to print the three dimensions of each individual board as it leaves the planer or other process.

Further objects are to provide control circuits for the Selsyn motor systems above described which are effective to assure that the actual printing motion of the apparatus takes place only when the indicia wheels of the apparatus are substantially at rest, preventing blurring of the printing and damage to the apparatus; to provide in said circuits means for feeding a strip of paper or the like one step for each board whereby the measurements of the boards are printed in columnar form; and to provide apparatus having the foregoing features in which more than one printing apparatus can be operated from a single set of sensing or primary equipment, permitting printed records of the lumber to be made and kept at places distant from the planing mill or the like.

Briefly, our invention comprises three pairs of telemetering devices which preferably are Selsyn motors properly arranged in individual circuited pairs. One of the primary Selsyn motors is mounted on the end of an arm and the other end of the arm is connected to the armature of a second primary Selsyn. A roller on the first mentioned Selsyn is disposed to engage upon the upper surface of a moving board, thereby to rotate the armature of the first named Selsyn. Upon moving upwardly, the arm on which the first mentioned Selsyn is mounted rotates the armature of the second mentioned Selsyn. The armature of a third primary Selsyn provides the pivot point for an arm having a roller which is disposed to engage against the side of the board. The corresponding secondary Selsyns of each pair are operatively connected in suitable manner to rotate indicia wheels on which are carried numbers or fractions to indicate, respectively, the thickness, width and length of the boards. Therefore, when the three primary Selsyns have their armatures rotated either by the arms or by the roller, as the case may be, the three secondary or follower Selsyns rotate precisely the same amount as the primary Selsyns, thereby properly to index the printing mechanisms to positions to print the exact, accurate dimensions of the particular and individual board. We provide a switch and suitable circuits to cause the indexed position of the printing mechanism corresponding to each board to be printed upon a paper strip or the like, whereby we obtain a running, columnar form of record of each board that passes through the mechanism. We provide suitable means for disengaging the indexing indicia wheel connected to the "length" Selsyn system whereby the same returns to zero as soon as each board passes from beneath the "sensing" portion of the apparatus. As will later appear, the thickness and width mechanisms return automatically because their Selsyn pairs return back to start position at the end of each board measuring operation. As will further appear in one modification of our invention which is especially adapted for use in counting pieces of lumber as they are pushed out of a planer by a subsequent piece. We provide means whereby the rear end of each board drops down slightly as it leaves the bed plate of the planer, and we use this movement to indicate the length of the board.

Apparatus illustrating the features of our invention is shown in the accompanying drawings forming a part of this application in which:

Fig. 15 is a wiring diagram of apparatus shown in Figs. 11 to 14, inclusive; and, Fig. 16 is a fragmental plan view of a strip of paper on which has been printed a record of the dimensions of a series of boards of different dimensions which has passed through that form of our improved apparatus shown in Figs. 11 to 15, inclusive.

For use in those instances where the lumber moves downwardly by gravity or is positively propelled in such manner as to provide endwise spaces between the boards, we may use the modification of our invention shown in Figs. 3 to 10, inclusive. In those instances where the lumber is pushed from the planer by the oncoming board, we use that modification of our invention shown in Figs. 11 to 15, inclusive.

Figures 1, 2, 3, 4:
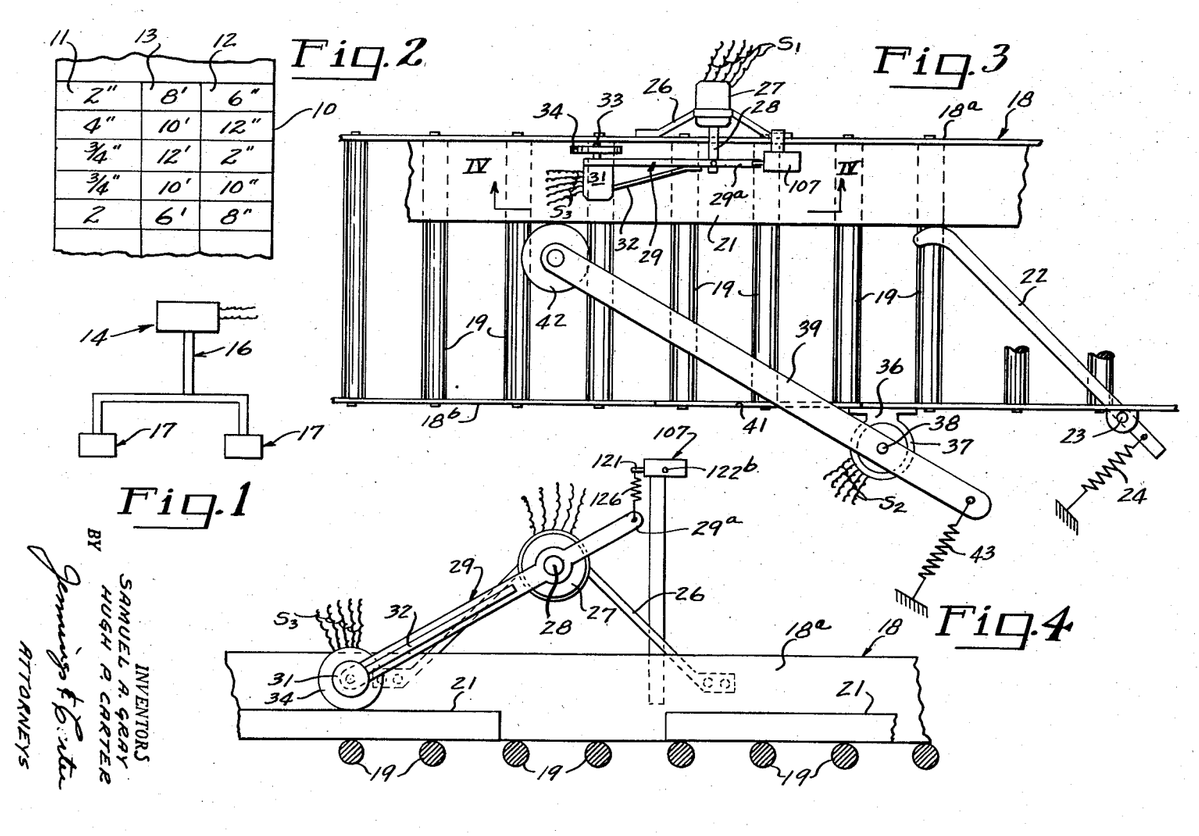
Fig. 1 is a wholly diagrammatic view illustrating a pair of printing mechanisms in circuit with a single sensing or indicating mechanism.
Fig. 2 is a fragmental plan view of a strip of paper on which has been printed a record of the dimensions of a series of boards of different dimensions which has passed through that form of our improved recording apparatus shown in Figs. 3 to 10, inclusive.
Fig. 3 is a fragmental plan view showing a piece of lumber in the process of passing through our improved apparatus.
Fig. 4 is an enlarged detail sectional view taken generally along line IV—IV of Fig. 3.

Referring now to Figs. 1 to 10, inclusive for a better understanding of our invention and more particularly to Fig. 2, it will be understood that the object of our invention is to provide a printed record which may be on a strip of paper 10 and which shows the three dimensions of each individual piece of lumber that passes through our improved apparatus. For instance, the column 11 of the strip may be the thickness column, column 12 may be the width column and column 13 may be the length column. As will appear, these columns may be rearranged if desired. As shown, in Fig. 2 the strip of paper 10 may be divided into horizontal spaces by the lines indicated, or, if desired, there may be no horizontal lines inasmuch as the figures can be spaced fairly close together and as will appear they are printed substantially in horizontal rows, one row for each board, whereby they may be read without difficulty.

As shown in Fig. 1 of the drawing our improved apparatus may consist essentially of an indicating or board sensing means indicated generally by the numeral 14 and which as will later appear embodies means to indicate or sense the three dimensions of each piece of lumber as it passes through the apparatus. The means 14 may be connected by suitable cables indicated generally by the numeral 16 to one or more printing or recording devices which are indicated generally by the numeral 17. Inasmuch as the cables 16 consist only of a plurality of wires or electrical circuits it will be apparent that the printing mechanisms proper may be located either immediately adjacent the place where the indicating mechanism 14 is located or at a distance therefrom.

As shown more clearly in Figs. 3 and 4, the indicating portion 14 of the device may comprise a trough-like section 18 having a plurality of rollers 19 forming the bottom thereof. The trough 18 may be placed at the discharge side of a planer or the like, not shown, and may be slightly inclined away from the planer whereby lumber 21 thereon moves by gravity downward, that is, to the left as shown in Figs. 3 and 4. For a reason later to appear we may provide suitable means in the form of a pusher arm 22 to keep the boards 21 pushed against one wall 18a of the trough 18. The arm may be pivoted at 23. A spring 24 may be employed resiliently to hold the inner end of the arm or pusher inwardly, to engage the edge of the boards and hold them against the wall 18a of the trough 18.

Mounted on a bracket 26 which may be secured in any suitable manner to the wall 18a of the trough is a first Selsyn motor 27. The motor 27 is so mounted that its armature 28 is free to be rotated, as will appear. Secured to the armature 28 of the motor 27 is an arm 29. Mounted on the lower end of the arm 29 is a second Selsyn motor 31. A suitable brace 32 may be provided rigidly to hold the Selsyn 31 in the correct position. The armature shaft 33 of the Selsyn motor 31 may carry thereon a friction roller 34 which is adapted to ride upon the top surface of the boards 21 as they pass down the trough 18. The arm 29 is provided with an extension 29a for a purpose later to appear.

Suitably mounted on the wall 18b of the trough 18, by means of a bracket 36 is a third Selsyn motor 37 having its armature shaft 38 vertically disposed. Non-rotatably secured to the shaft 38 is a horizontally disposed arm 39. The arm passes through a slot 41 in the side wall 18b of the trough. Rotatably mounted on the inner end of the arm 39 is a roller 42 which is disposed to run against the edge of the boards 21 as they pass through the apparatus. A spring 43 biases the inner end of the arm inwardly, toward the edge of the path of movement of the boards, that is, toward the side 18a of the trough 18.

From what has just been described it will be apparent that as the boards 21 move down the trough they are pressed against the wall 18a by the presser member 22. As the boards come into position they rock the arm 39 outwardly, rotating the armature shaft 38 of the Selsyn 37. In similar manner the arm 29 moves upwardly in response to upward bodily movement of the Selsyn 31, rotating armature 28 of the Selsyn 27. As the board moves along, armature shaft 33 of Selsyn 31 is rotated due to the frictional engagement of the roller 34 on top of the board. It will be apparent, therefore, that from the rotation of the respective armatures of the several Selsyns, the Selsyn 37 will give an indication of the width of the boards, Selsyn 27 will give an indication of the thickness of the boards, and Selsyn 31 will give an indication of the length of the boards. The manner of connecting the Selsyns just described with the printing mechanism together with the printing mechanism itself and the controls therefor will now be described.

Figure 5:
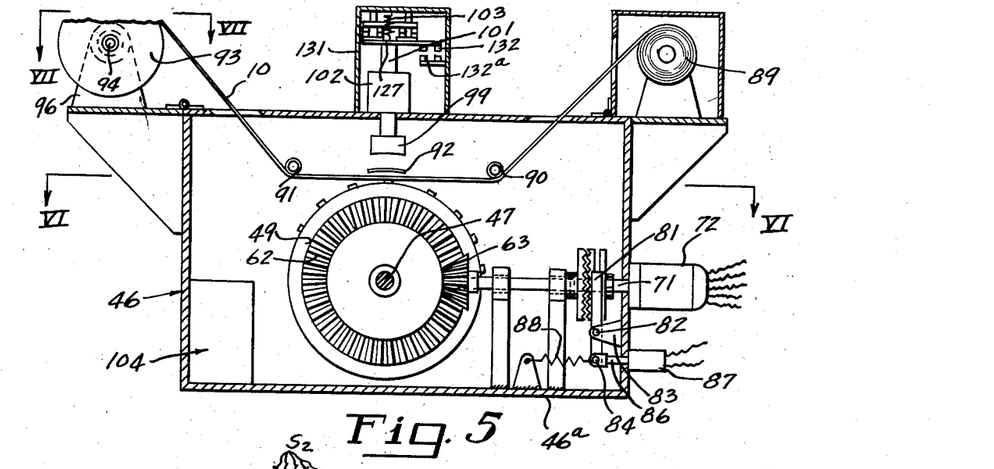
Fig. 5 is a detail sectional view taken generally along line V—V of Fig. 6.
Figures 6, 7, 8:
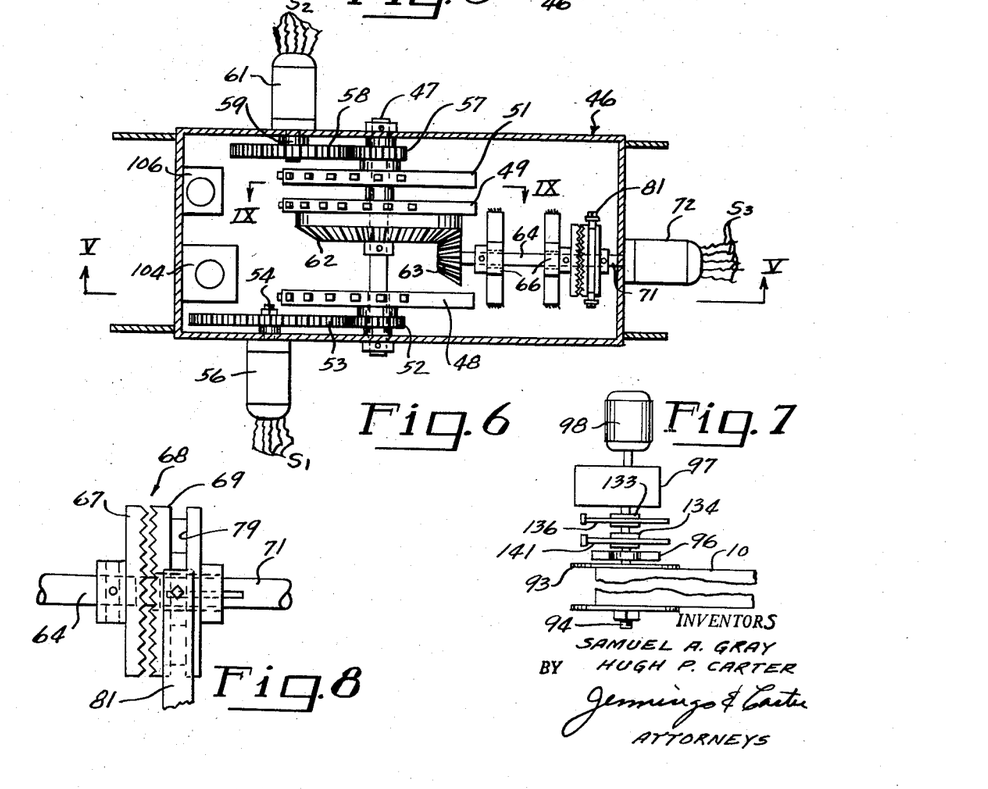
Fig. 6 is a detail sectional view taken generally along line VI—VI of Fig. 5.
Fig. 7 is a detail plan view, drawn to a smaller scale, taken generally along line VII—VII of Fig. 5 and showing the strip drive for the printing mechanism.
Fig. 8 is an enlarged fragmental elevational view of a form of clutch which may be associated with the "length" indicating printing wheel of our improved apparatus.

Referring now more particularly to Figs. 5 and 6 of the drawings the printing mechanism may be enclosed in a box-like housing 46. Non-rotatably mounted in the housing 46 is a shaft 47. Rotatably mounted on the shaft 47 are indicia or type carrying printing wheels 48, 49 and 51. The wheel 48 is disposed to print the thickness of the boards in the column 11, wheel 49 is disposed to print the length of the boards in the column 13, and wheel 51 is disposed to print the width of the boards in the column 12.

Formed integrally or otherwise connected to the side of the printing wheel 48 is a pinion 52. In mesh with the pinion 52 is a larger gear 53 which is non-rotatably mounted on the armature shaft 54 of a Selsyn motor 56 which is paired with the Selsyn 27 by the circuits S1.

In somewhat similar manner there is mounted integrally or otherwise attached to a side of the printing wheel 51 a pinion 57. In mesh with the pinion 57 is a gear 58 non-rotatably mounted on the armature shaft 59 of a Selsyn motor 61. The Selsyn motor 61 is paired with the Selsyn 37 by the circuits S2.

Secured to a side of the printing wheel 49 is a bevel gear 62. In mesh with the bevel gear 62 is a bevel pinion 63. The pinion 63 is fast on the end of a shaft 64 which is journalled for rotation in bearings 66 mounted in suitable manner on the bottom 46a of the housing 46.

As best shown in Fig. 8 of the drawings there is mounted non-rotatably on the end of shaft 64 one-half 67 of a crown gear type clutch indicated generally by the numeral 68. The other half 69 of the clutch 68 is keyed slidably on but non-rotatably affixed to the armature shaft 71 of a Selsyn 72. The Selsyn 72 is paired with the length Selsyn 31 by the circuits S3.

Figure 9:
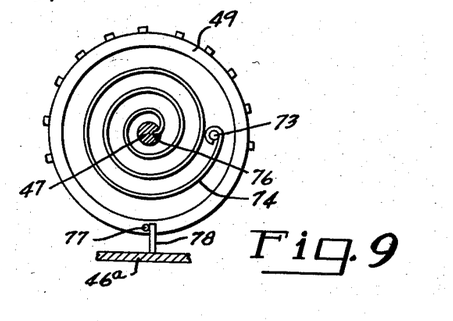
Fig. 9 is a detail sectional view taken generally along line IX—IX of Fig. 6.

Referring particularly to Fig. 9 of the drawings it will be seen that the indicia wheel 49 has outstanding from a side thereof a pin 73. Fixed to the pin is one end of a spiral type leaf spring 74, the other end thereof being anchored at 76 in a slot provided in the shaft 47. On the outer periphery of the indicia wheel is a pin 77 which is disposed to come to rest against a stop 78 carried by the housing bottom 46a whenever the clutch 68 is released. As will appear, the wheel 49 returns to start position under the influence of spring 74 when the clutch 68 is released.

The clutch half 69 is provided with an annular groove 79 extending thereabout. Disposed to cooperate with the groove 79 to slide the clutch half 69 on the shaft 71 is a clutch yoke 81. The yoke 81 is pivoted at 82 to a suitable bracket outstanding from a wall of the housing as at 83. See Fig. 5. The lower end of the yoke is pivotally connected at 84 to the armature 86 of a solenoid 87. A spring 88 biases the clutch 68 toward disengaged position as clearly shown in Fig. 5 of the drawings.

Mounted on top of the housing 46 in suitable manner is a supply roll 89 for the paper strip 10 on which the printing is to be done. The strip 10 feeds downwardly and under guide rolls 90 and 91 over the printing wheels 48, 49 and 51. Disposed to be moved step by step by a mechanism not shown is an inked ribbon 92, located at the top of the printing wheels, over the paper 10. The paper strip 10 is taken up on a roll 93 which is removably mounted on a shaft 94. The shaft 94 is supported in a bearing 96 mounted on top of the housing 46 and is driven from the output of a reduction gear box 97. The gear box 97 is driven by an electric motor 98 under control of circuits presently to be described.

Disposed over the ribbon 92 is a printing platen 99 which may be secured to the lower end of the armature 101 of a solenoid 102. A spring 103 biases the armature and hence the platen normally into upward or raised position.

From what has already been described it will be seen that the Selsyns 56, 61 and 72 all rotate precisely in accordance with the rotation of their respective Selsyns forming a part of the indicating unit 14. The method of operation of these devices is well known and well understood in the art. It is known that a Selsyn in circuit with another will rotate faithfully and precisely in the same direction and through the same degree of rotation as the primary or driven one is rotated. Therefore, the printing wheels are indexed faithfully in accordance with the rotation of the armatures of the Selsyns 27, 31 and 37, thus to set the three dimensions, ready for printing on the paper strip 10 at the proper time by the control circuits and means now to be described. As likewise is understood, some means of dampening the Selsyns may be necessary to eliminate any slight "hunting" tendency thereof.

Mounted in the housing 46 are solenoid controlled switches indicated in Figs. 5 and 6 generally by the numerals 104 and 106. Mounted over the extension 29a of arm 29, in position for its contact arm to be actuated by the arm 29a is a switch indicated generally at 107.

Figure 10:
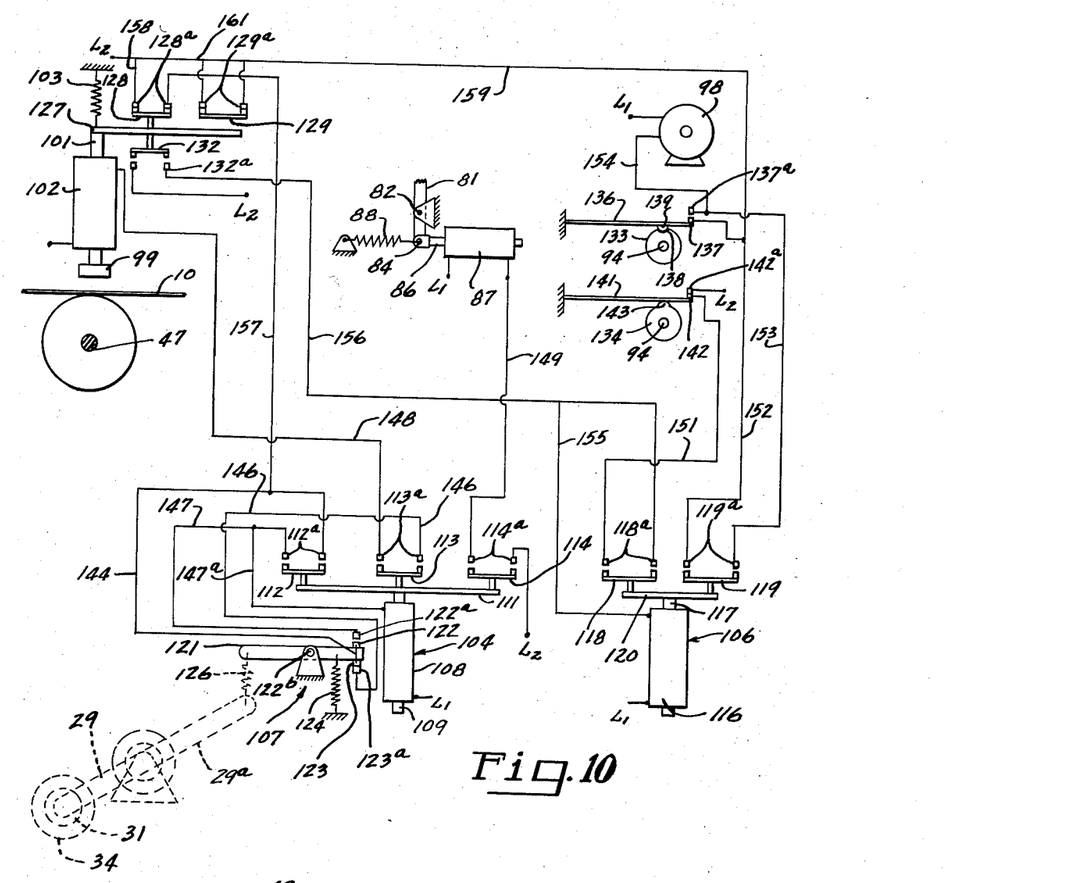
Fig. 10 is a wiring diagram of the apparatus shown in Figs. 1 to 9, inclusive.

Referring particularly to Fig. 10 of the drawings it will be seen that the switch 104 comprises a solenoid having a coil 108 and an armature 109. The armature carries a cross bar 111 of insulating material. Mounted on the cross bar are contact strips having sets of contacts 112, 113 and 114. Sets of stationary contacts 112a, 113a and 114a are disposed to coact respectively with the movable contacts. All of these contacts normally are open, all of the same being simultaneously closed when the coil 108 is energized.

Switch 106 comprises the solenoid coil 116 and an armature 117. Contact strips having contacts 118 and 119 are mounted on a bar 120 of insulating material carried by the armature. Stationary sets of contacts 118a and 119a coact respectively with the sets of contacts 118 and 119 as shown. The switch 106 normally is open, being closed when the coil 116 is energized.

The switch 107 may comprise a contact arm 121 which is pivoted at 122b in suitable manner to the housing of the switch 107. On the inner end of the arm 121 are contacts 122 and 123. Stationary contacts 122a and 123a coact with the contacts 122 and 123 as shown. A spring 124 urges the arm 121 to a position to close the contacts 123 and 123a. The extension 29a and the end of arm 121 are connected by a spring 126, thereby providing a resilient connection between the switch and the end 29a of arm 29.

The printing solenoid 102 serves also as means to actuate sets of contacts. As shown, the armature 101 carries a bar 127 of insulating material. On top of the bar are strips having contacts 128 and 129. Adapted to coact with the contacts 128 and 129 are stationary contacts 128a and 129a, respectively. The stationary contacts may be mounted in any suitable insulated manner from the side walls of a box-like cover 131 mounted on the housing 46. The contacts 128—128a and 129—129a normally are closed, being opened when the coil 102 is energized as will later appear. On the under side of the bar 127 is another strip which carries contacts 132 as shown. Stationary contacts 132a are disposed to be closed with respective ones of the contacts on the bar 132. The contacts 132a are mounted in suitable insulated manner from the side walls of the cover 131.

Mounted on the shaft 94 which carries the tape-up paper roll 93 are cams 133 and 134. Mounted over the cam 133 is a switch arm 136 which carries a contact 137 on its outer end. The cam 133 is provided with a depression 138 therein into which a detent 139 rests when in the position shown in Fig. 10, whereby the switch point 137 is out of contact with its associated stationary contact 137a.

Mounted over the cam 134 is a switch arm 141 having a contact 142 on its outer end. The cam 134 is provided with a protuberance 143 which is disposed to close the contact 142 against the associated stationary contact 142a when the parts are in the position shown in Fig. 10.

The various switches, solenoids and the like are connected to each other in the manner shown. The power supply lines are indicated by the letters L1 and L2. The contacts 122 and 123 are connected by a line 144 to one of the stationary contacts 112a. The contact 123a is connected by a line 146 to one of the stationary contacts 113a. Stationary contact 122a is connected by a line 147 to one of the stationary contacts 112a. The other stationary contact 113a is connected by a line 148 to one side of the coil 102 of the printing solenoid. The other side of the coil 102 is connected to line L1.

One of the contact points 114a is connected to L2 as shown. The other thereof is connected by a line 149 to one side of the coil 87 of the clutch solenoid. The other side of the coil 87 is connected to L1 as indicated. One of the stationary contacts 118a is connected by a line 151 to the movable contact 142. Contact 142a is connected to L2.

One of the stationary contacts 119a is connected by a line 152 to the movable contact 137. The other stationary contact 119a is connected by a line 153 to the stationary contact 137a. A branch line 154 connects the line 153 to one side of the motor 98. The other side of the motor is connected to L1.

The other stationary contact 118a is connected by a line 156 to one of the stationary contacts 132a and by a branch line 155 to one side of the coil 116. The other stationary contact 132a is connected to L2. A branch line 157 connects the line 144 to one of the stationary contacts 128a. The other thereof is connected by a line 158 to L2.

A branch line 159 connects the line 152 with one of the stationary contacts 129a. A branch line 161 connects the other contact 129a to L2.

Starting with the parts in the position shown in Fig. 10 it will be apparent that as soon as a piece of lumber 21 moves down the trough 18 the first action is to raise the lower end of arm 29 carrying Selsyn 31, thus closing contact 122 against 122a and opening 123—123a. The closing of 122—122a energizes coil 108 from L2, 128—128a, lines 157 and 144, 122—122a, line 147 and a branch line 147a connecting one other side of the coil 108 to the line 147, thence to L1. This closes all of the contacts carried by the arm 111. The closing of contacts 114—114a energizes the clutch coil 87, closing the clutch. The length counter roller 34 transmits motion of the armature of Selsyn 31 to the Selsyn 72, thereby rotating indicia wheel 49. Substantially simultaneously with the foregoing the armature of Selsyn 27 has been rotated thereby rotating the armature of its associated Selsyn 56, indexing the thickness printing wheel 48 to the proper position. In similar manner, the outward movement of arm 39 in response to engagement of its roller 42 with the edge of the board has moved the armature of Selsyn 37. This in turn moves the armature of Selsyn 61 correspondingly, thereby indexing the width printing wheel 51. As soon as a piece of lumber passes from beneath roller 34, allowing it to drop, contacts 123—123a are closed. However, coil 108 remains energized through the holding circuit shown which includes contacts 112—112a and 128—128a. The closing of 123—123a causes the coil 102 of the stamping solenoid to be energized through contacts 113—113a and 128—128a, thus completing the circuit to L2. This causes the platen 99 to strike the paper, printing the reading of the several wheels. On the stamping motion of the armature 101 the contacts 128—128a and 129—129a are opened, momentarily closing 132 and 132a, energizing coil 116. The opening of 128—128a de-energizes coil 108, opening all of the sets of contacts controlled by arm 111. The opening of 114—114a de-energizes the clutch coil 87, allowing the clutch to open. The opening of 113 and 113a de-energizes the coil 102, opening 132—132a and closing 128—128a and 129—129a. As stated above, during the time contacts 132—132a were closed, relay coil 116 was energized. Coil 116 remains energized through contacts 118—118a and contacts 142—142a when 132—132a opens. The closing of 119—119a causes the paper reel motor 98 to start. The cams 133 and 134 are so related to the motor shaft, on the output shaft of the gear box 97, that they rotate one revolution when the paper moves from one stamping position to the next. The turning of cam 133 closes 137—137a, causing motor 98 to continue to run for one revolution of cam 133. The rotation of cam 134 shown in Fig. 10 de-energizes relay coil 116, permitting the contacts controlled thereby to open. The opening of 119—119a, which as will be seen provide a shunt circuit around contacts 137—137a, makes the latter contacts the only current path to the motor 98. Therefore, when cam 133 permits the contacts 137—137a to open the motor is de-energized, thus completing a cycle.

Referring now more particularly to Figs. 11 to 16 of the drawings, we will now describe a modification of our invention which is especially adapted for use in those instances in which the oncoming board from a planer or the like pushes outwardly, ahead of itself, a preceding board. As will be understood, the usual planer operates in this manner, the boards being delivered therefrom by driven rollers which engage the oncoming board, moving it in endwise engagement against the preceding board. Therefore, in those instances it is not possible to have endwise space between the boards to permit the roller or control means for the length measuring device to pause or stop in its rotation.

Figure 11:
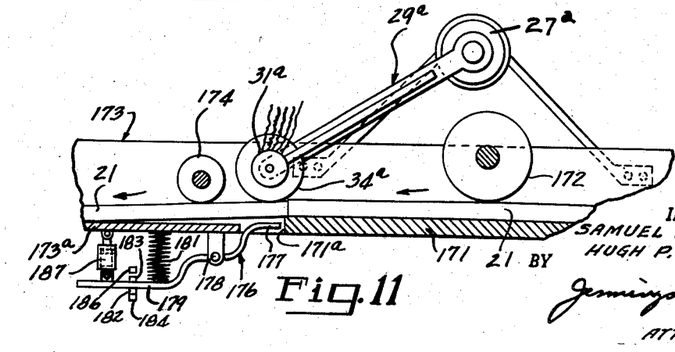
Fig. 11 is a view corresponding generally to Fig. 4 and showing a means for adapting our invention to planers in which the oncoming board pushes or propels the board just preceding the same.

As shown in Fig. 11, we indicate at 171 the bed plate of the planer proper, the lumber 21 being propelled therefrom in the direction of the arrow by means of a driven roller forming a part of the planer and indicated diagrammatically at 172. As shown, the board 21 still in the planer is pushing outwardly by endwise engagement a preceding board 21.

In order to interrupt, momentarily, the cycle of the device insofar as measuring the length of the board is concerned, we provide a trough 173 having a bottom 173a which is disposed slightly below the end 171a of the bed plate of the planer. In practice we place the bottom of the trough so that the upper surface thereof is in the neighborhood of ¼ inch below the top of the bed plate 171. This assures that boards of ordinary minimum thickness (generally no thinner than ¾ inch) remain in endwise engagement so that the preceding board is pushed outwardly as desired. Therefore, the boards are pushed from the planer into the trough and the rear end of each board is free to drop down at the place indicated. In order to assure that the boards drop down as the rear end leaves the end 171a of the bed plate we provide a weighted roller 174 which extends across the trough 173, in contact with the board being pushed. As will appear, we use the drop-down of the board to close a switch and thereby to operate the printing portions of the apparatus.

Insofar as the width and thickness are concerned we employ substantially the same mechanism as have been previously described. Thus, we have an arm 29a which carries the Selsyn 27a, which is the "thickness" Selsyn and which is in circuit with the Selsyn 61a. A roller 34a on the armature of Selsyn 31a rides on top of the boards 21 as shown. We employ the roller 42 on the end of the arm 39, which actuates a Selsyn 37 in circuit with a Selsyn 56a. The Selsyns 56a and 61a drive width and thickness printing wheels 48a and 49a through the gears shown in Fig. 13. In view of the fact that in a planing mill the boards are delivered along a given side edge there is no need for the pusher 22. Therefore, and as will appear, the major portion of the difference in the present modification being described lies in the mechanism and control circuits to record the length of the boards as they move in end to end relationship.

Referring now again to Fig. 11 of the drawings, immediately adjacent the end 171a of the bed plate we place a switch arm 176. The arm 176 has an end 177 in position to be struck by the down moving board as its rear end clears end 171a of the bed plate. The arm is pivoted at 178 and has an extension portion 179 which is biased in the direction shown by a compression spring 181.

Mounted on the arm extension 179 are movable contacts 182 and 183. Contact 182 is biased normally into engagement with stationary contact 184, while the downward movement of the end 177 of the switch momentarily closes contact 183 against stationary contact 186. A dash-pot 187 may be attached to the switch arm as shown in order to slow down the return of the switch arm to the position shown after it has been momentarily closed by the board.

Figure 12:
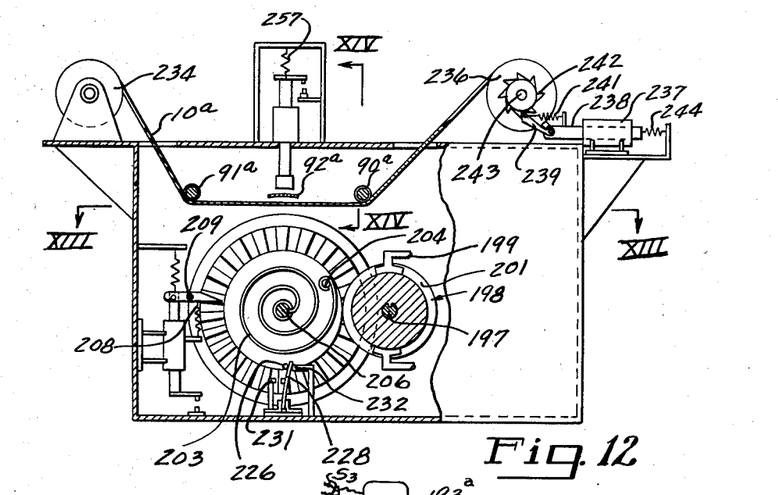
Fig. 12 is a detail sectional view taken generally along line XII—XII of Fig. 13.
Figures 13, 14:
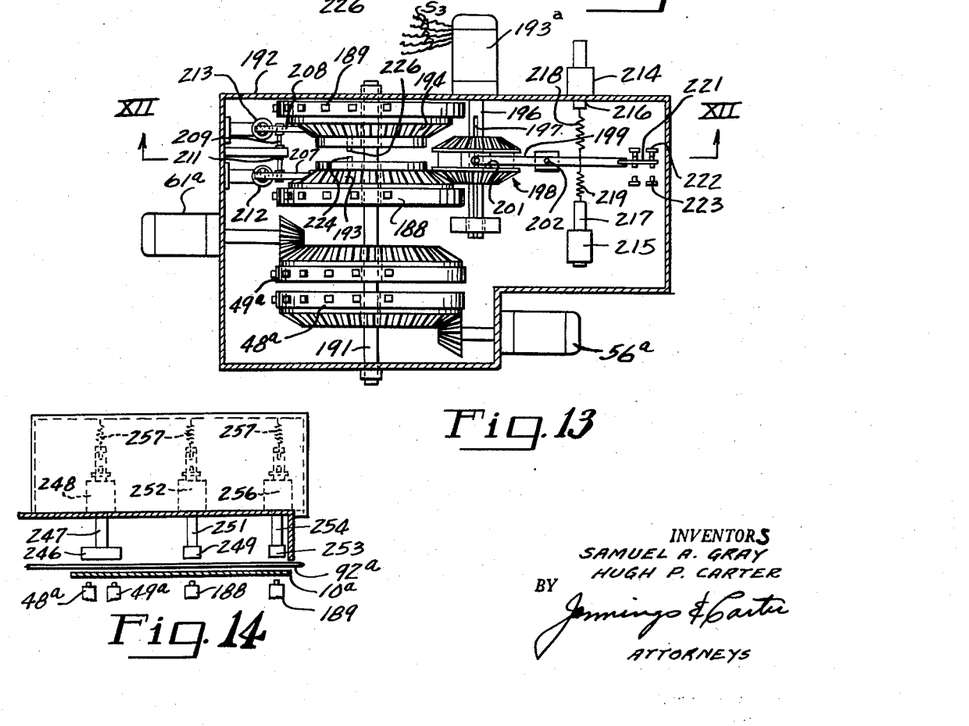
Fig. 13 is a detail sectional view taken generally along line XIII—XIII of Fig. 12.
Fig. 14 is a fragmental detail sectional view taken generally along line XIV—XIV of Fig. 12.

Referring now to Figs. 12, 13 and 14 our improved printing mechanism may comprise, in addition to the printing wheels 48a and 49a, a pair of length printing wheels 188 and 189. The wheels 188 and 189, as well as the wheels 48a and 49a are mounted rotatably on a shaft 191 which is provided in a housing 192. The length Selsyn 193a is in circuit with the length Selsyn 31a as has been described through the circuits S3, it being understood that a suitable source of power is included within the circuits S3. It will be noted that the indicia wheel 188 carries a bevel gear 193. Facing this gear is a bevel gear 194 carried by the printing wheel 189. The bevel gears are spaced slightly apart as shown.

The shaft 196 of Selsyn 193a is provided with an axially splined end portion 197. Slidably mounted on the splined end 197 is a double bevel gear clutch indicated generally by the numeral 198. A yoke 199 fits in a groove 201 provided in the gear clutch 198. The yoke is pivoted at 202. It will thus be seen that when the gear clutch 198 is moved to one position length printing wheel 188 is rotated by the Selsyn 193a, and when moved to the other position length printing wheel 189 is rotated.

Each of the printing wheels 188 and 189 is biased to return position by means of a coil spring 203. The spring 203 has one end affixed as at 204 to the side of the respective gears and the other end is anchored at 206 to the shaft 191.

Disposed to cooperate with the gears 193 and 194 are holding pawls 207 and 208, respectively. The pawls may be pivoted on a shaft 209 supported in a bearing 211 which is mounted in suitable manner in the housing. The pawls are adapted to be released by solenoids 212 and 213, respectively, and in a manner later to appear.

The clutch 198 is adapted to be shifted first in one position and then in the other by means of a pair of solenoids 214 and 215. The solenoid armatures 216 and 217 are connected to the yoke arm by means of pull springs 218 and 219 as shown. Also, for a purpose later to appear, there is a movable switch arm 221 mounted on the end of the yoke arm. Stationary contacts 222 and 223 are adapted to cooperate with the contact arm 221 for a purpose also later to appear.

Referring again to Fig. 12 the spring returned printing wheels 188 and 189 have projecting from a side thereof stop pins 224 and 226. The pins are adapted to contact switch arms 227 and 228, respectively, thereby to move the switch arms out of contact with stationary contacts 229 and 231, respectively. Each of the switch arms, when moved to the position shown in Fig. 12, comes to rest against insulated stops 232, forming a mechanical stop to prevent further rotation of the wheels by their springs.

The paper feed mechanism may comprise a supply roll 234 for the paper strip 10a and a take-up roll 236. The paper passes downwardly under rollers 91a and 90a. The take up reel 236 may be driven by means of a solenoid 237 having an armature 238. On the end of the armature 238 is a pawl 239 which is biased by a spring 241 into position to engage in step by step manner the teeth of a ratchet gear 242 fast on the shaft 243 carrying the take-up roll 236. A spring 244 biases the solenoid armature 238 to the right as viewed in Figs. 12 and 15. Mounted above the wheels 48a and 49a is a printing platen 246. The printing platen 246 is on the end of the armature 247 of a solenoid 248.

Mounted above the length wheel 188 is a printing platen 249 which is on the armature 251 of a printing solenoid 252. In similar manner, there is mounted above the length printing wheel 189 a printing platen 253 which is on the end of the armature 254 of a printing solenoid 256. As will be understood, a ribbon 92a is fed by suitable means, not shown, across the paper, between the type wheel and the printing platens. The armatures of all the solenoids just mentioned are biased upwardly by means of springs 257 as shown in Fig. 14 of the drawings.

From the description of the mechanism and switches so far given it is now possible to explain the remaining switches and circuits for the operation of this modification of our invention. As shown in the wiring diagram, Fig. 15, stationary contact 184 of the switch 176 is connected by a line 258 to the solenoid 237. The other terminal of the solenoid is connected to L1 as shown. The movable switch arm carrying the contacts 182 and 183 is connected to L2 as shown. Contact 186 is connected by a line 259 and a branch line 259a to the movable contact arm 221 and the contacts thereon and to one side of the solenoid 248. The other side of the solenoid 248 is connected to L1.

Figures 15, 16:
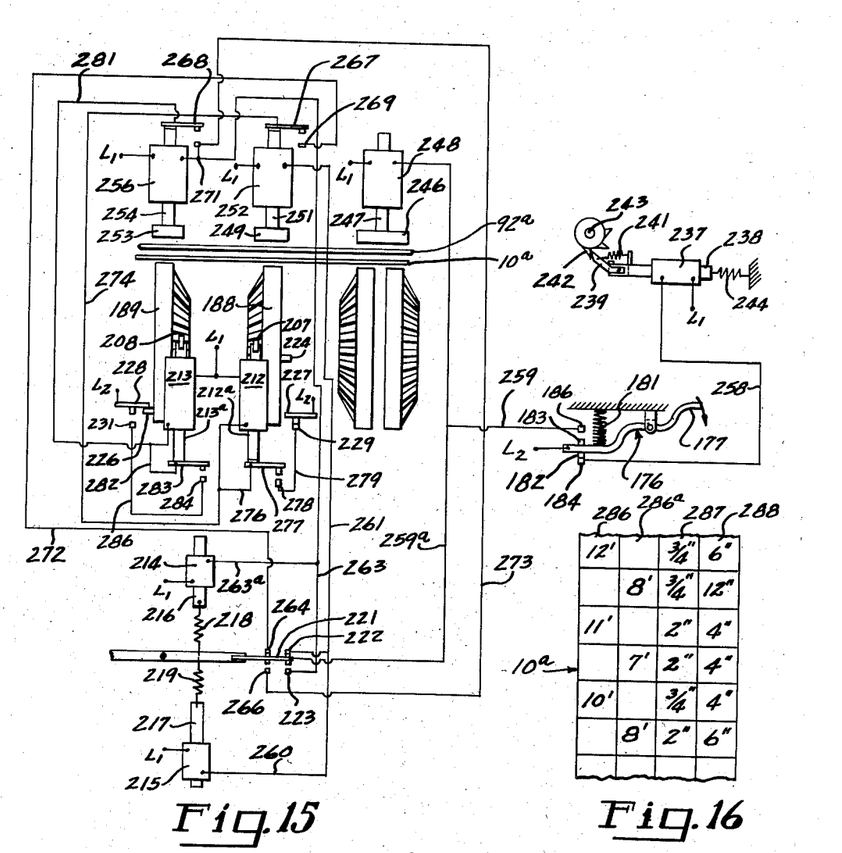

Stationary contact 222 is connected by a line 261 to one side of the solenoid 252, the other side being connected to L1. A branch line 260 connects the line 261 and contact 222 with one side of the solenoid 215, the other side being connected to L1.

A line 263 connects the stationary contact 223 with one side of solenoid 256 and through a branch line 263a with one side of solenoid 214. The other sides of the solenoids are connected to L1. For purposes later to appear switch arm 221 is provided with additional contacts which cooperate with stationary contacts 264 and 266.

Mounted on the upper ends of the armatures 251 and 254 are switch arms 267 and 268, each of which carries a contact. Stationary contacts 269 and 271, respectively, are disposed to be closed with the contacts of the switch arms when the solenoids are energized. Contact 269 is connected by a line 272 to the stationary contact 264. Stationary contact 271 is connected by a line 273 to the stationary contact 266.

The switch arm 267 is connected by a line 274 to one side of the solenoid 212 and by a branch line 276 to a switch arm 277 carried on the lower end of the armature 212a of the solenoid 212. A stationary contact 278 is adapted to be engaged by the switch arm 277 when the solenoid 212 is energized. A line 279 connects the stationary contacts 278 and 229.

In similar manner to the circuit just immediately described, contact arm 268 is connected by a line 281 to one side of the solenoid 213. A branch line 282 connects the line 281 to a contact arm 283 which is carried on the lower end of the armature 213a of the solenoid 213. The arm 283 has a contact which is adapted to close against a contact 284 when the solenoid 213 is energized. A line 286 connects the stationary contacts 284 and 231. The switch arms 227 and 228 are connected to L2 as indicated.

The operation of the modification of our invention shown in Figs. 11 to 16 inclusive is adapted to produce a record of the kind shown in Fig. 16. It will there be seen that the paper strip 10a on which the record is to be made is laid out to provide two "length" columns 286 and 286a, a thickness column 287 and a width column 288. It will be understood that with the two printing wheels for the length 188 and 189, the same print alternately, the wheel 188 printing in column 286a while wheel 189 prints in column 286. Concerning columns 287 and 288, it will be understood that the substantially identical arrangement for the width and length Selsyns which have previously been described may be employed in the modification of our invention just described. Therefore, the description of the operation of this modification will be confined substantially to a description of that portion of the apparatus which is adapted to record the length of the boards in the columns 286 and 286a.

With the boards being pushed out of the planer over the end 171a of the bed plate 171, roller 174 assures that each board drops downwardly as soon as its rear end clears the edge 171a of the bed plate. The effect of this is to close switch 176, closing its contact 183 against stationary contact 186. It will be noted that the solenoid 237, which is the stepping solenoid for the paper feed, in the beginning is held energized through line 258, contacts 182, 184 and the other connection to L1. As soon as the switch 176 moves in response to being actuated by a board, solenoid 237 is momentarily de-energized and its spring 244 returns its armature to the right as shown in Fig. 15, causing the pawl 239 to engage a new tooth on the ratchet 242. The closing of the contacts 182—184 energizes solenoid 237 and causes the paper to feed as indicated.

Closing of contacts 183—186 establishes a circuit from L2 to the printing solenoid 248 which immediately prints the thickness and width of the board in the columns 287 and 288. In similar manner, and through the selector switch comprising arm 221, the contacts thereon and the stationary contacts associated therewith, either solenoid 252 or 256 is energized as indicated. In the position shown in Fig. 15 of the drawings the closing of contacts 183—186 is effective to energize solenoid 252. This is accomplished through line 259, branch line 259a, switch arm 221, contact 222, and line 261, thence to L1 through the solenoid 252. Momentary closing of solenoid 252 therefore causes the platen 249 to print the length of the board in column 286a.

Momentary energization of solenoid 252 closes switch arm contact 267 against stationary contact 269. This establishes a circuit, momentarily, from switch arm 221, contact 264, line 272, contact 269, arm 267, line 274, to solenoid 212, causing the solenoid armature 212a to move downwardly, releasing the pawl 207. Downward movement of the armature 212a establishes a holding circuit through the switch arm 227, contact 229, contact 278, arm 277, to the solenoid 212 and thence to L1 as shown. These connections cause the pawl 207 to be released and holds the same released until such time as the stop or pin 224 moves the contact arm 227 away from the contact 229. It will be understood that substantially simultaneously with the energization of the foregoing circuits solenoid 215 will have been energized, shifting the gear clutch 198 from contact with the bevel gear driving the printing wheel 188 to the gear driving the wheel 189. Therefore, Selsyn 193a continues to rotate in response to the engagement of roller 34a on top of the end to end boards 21, and yet, the length of each board is accurately indicated on the strip of paper 10a.

While we have not shown the same in the circuits nor described the same in this specification, it will be apparent to those skilled in the art that suitable delay means, either electrical or mechanical, may be interposed in the circuits or associated with certain parts of the mechanism to obtain fractional second delay of the actuation of the several solenoids relative to each other. At all events, it will be apparent that the selector switch on arm 199 which is moved to alternate positions by solenoids 214 and 215 controls the one of the printing solenoids 252 or 256 which is to operate at a given time and also is effective to release the printing wheels 188 and 189 to the action of their return springs at the proper time. Also, the common printing platen 246 and its solenoid 248 are controlled in simple manner from the switch arm 176.

From the foregoing it will be apparent that we have devised an improved apparatus for making, in automatic manner, a record of the thickness, width and length of a board as it moves along in the process of manufacture. It will be understood that the paper strips 10 or 10a may be commenced with one carload or bin of lumber and the record actually removed from the machine and shipped with the carload if that is desired. In addition, one may easily make any number of identical records through the use of the system shown. It will also be apparent that instead of using a ribbon and feed means therefor one might easily use the so-called "saddle-backed" paper and thereby produce one or even two carbon copies. It will be especially noted that the circuits for our improved apparatus eliminate the possibility of the paper strip being in motion during the printing stroke of the platens. The use of the clutches and the return springs for the length printing wheels eliminates the necessity of having to reset those wheels by reversing the direction of the armature of Selsyn motors 31 or 31a.

While we have shown our invention in but two forms, it will be obvious to those skilled in the art that it is not so limited but is susceptible of various other changes and modifications without departing from the spirit thereof, and we desire, therefore, that only such limitations shall be placed thereupon as are specifically set forth in the appended claims.

What we claim is:

1. In apparatus for indicating the thickness, width and length of longitudinally moving boards and the like, a first arm pivoted adjacent the board to move away from a side of the path of travel thereof an amount corresponding to the thickness of the board, a second arm pivoted adjacent the board to move away from an edge of the path of the travel thereof an amount corresponding to the width of the board, first and second rotary electric signal sending means rotatable by each of said arms and effective thereby to give signals corresponding to the thickness and width of the board, a third electric signal sending means having a rotatable member engaging a surface of the moving board and effective by said rotation to give a signal corresponding to the length of the board, rotary signal receivers in circuit with each of said senders, and rotary indicia wheels operatively connected to the receivers and movable thereby to positions indicating individually and in adjacent relationship to each other the said dimensions of the board.

2. Apparatus as defined in claim 1 in which the third signal sender is located on one of said pivoted arms.

3. Apparatus as defined in claim 1 in which the third signal sender is located on the first named pivoted arm and in which the rotatable member engaging the surface of the moving board engages the upper surface thereof.

4. In lumber size indicating apparatus, three circuited pairs of primary and secondary Selsyn motors, a lumber thickness gauge operatively connected to the primary motor of a first pair thereof and disposed to rotate the armature of said primary motor in accordance with the thickness of a piece of lumber, a lumber width gauge operatively connected to the primary Selsyn of a second pair thereof and disposed to rotate the armature thereof in accordance with the width of said piece of lumber, a linear measuring roller adapted to engage a surface of said piece of lumber and to be rotated thereby when the lumber moves, said roller being operatively connected to rotate the armature of the primary Selsyn of the third pair, and rotary indicators operatively connected to the secondary Selsyns of said pairs and effective to indicate individually and in adjacent relationship to each other the respective measurements given by said pairs of Selsyns.

5. In apparatus for indicating the length of a moving board while it is moving away from a planer in end to end abutted relation with an oncoming board, means to change the vertical relationship between the abutted ends of the boards after the one to be measured has been discharged from the planer, a rotary length measuring member in contact with a surface of the board to be measured, a primary telemetering device of the rotary type driven by the roller, a secondary telemetering device of the rotary type in circuit with the primary one and movable in response to signals received from said primary one, a pair of length indicating indexible printing members, actuating means effective alternately and operatively to connect the secondary telemetering device to said printing members, and means responsive to the change in the vertical relationship between the abutted ends of the boards to energize the actuating means and thereby disconnect the secondary device from one of said printing members and operatively connect it to the other thereof.

6. Apparatus as defined in claim 5 in which the means to disconnect the secondary device from one of said telemetering devices and operatively connect it to the other thereof comprises an electric switch closeable upon a change in the vertical relationship between the abutted ends of said boards, and circuits connecting the switch and said actuating means.

7. In apparatus for measuring the length of a first board moving endwise in abutted end to end relationship relative to a second board, a drop-off over which the boards move whereby the rear end of the first board drops down slightly relative to the forward end of the second board, a roller mounted to rotate on a surface of the first board and mounted near the said drop-off, an electric switch positioned to be closed when the rear end of the first board drops down, a primary Selsyn motor having its armature driven by the roller, a clutch element, a secondary Selsyn motor operatively connected to drive the clutch element, a pair of indexible length printing members, electric means disposed selectively and alternately to connect the length printing members to said secondary Selsyn motor through said clutch element, a selector switch in circuit with the first named switch and said electric means, and circuits connecting the first named switch and the electric means through the selector switch.

8. Apparatus as defined in claim 7 in which there are springs biasing the printing members to start position, electrically releasable pawls holding the same in indexed positions against the force of said springs, and circuits effective to energize the pawl release means upon a change in the drive connection of the secondary Selsyn from one printing member to the other.

References Cited in the file of this patent
UNITED STATES PATENTS

| | | |
|---|---|---|
| 299,745 | Cooke | June 3, 1884 |
| 803,393 | Blades | Oct. 31, 1905 |
| 868,793 | Metzner | Oct. 22, 1907 |
| 1,560,046 | Dye | Nov. 3, 1925 |
| 1,581,315 | Johansson | Apr. 20, 1926 |
| 1,829,318 | Walen | Oct. 27, 1931 |
| 2,056,918 | Bristol | Oct. 6, 1934 |
| 2,128,709 | Kramer | Aug. 30, 1938 |
| 2,610,843 | Schellentrager | Sept. 16, 1952 |
| 2,640,275 | Boucher | June 2, 1953 |
| 2,812,583 | Herzegh | Nov. 12, 1957 |

FOREIGN PATENTS

| | | |
|---|---|---|
| 174,401 | Germany | Sept. 21, 1906 |
| 97,996 | Austria | Sept. 25, 1924 |